United States Patent
Dhamdhere et al.

(10) Patent No.: US 12,362,997 B2
(45) Date of Patent: Jul. 15, 2025

(54) GUIDING CONFIGURATION OF A SWITCH STACK

(71) Applicant: Sophos Limited, Abingdon (GB)

(72) Inventors: Shilpa Sachin Dhamdhere, Southborough, MA (US); Alan Charles Toews, Billerica, MA (US)

(73) Assignee: Sophos Limited, Abingdon (GB)

( * ) Notice: Subject to any disclaimer, the term of this patent is extended or adjusted under 35 U.S.C. 154(b) by 84 days.

(21) Appl. No.: 18/373,121

(22) Filed: Sep. 26, 2023

(65) Prior Publication Data

US 2025/0106107 A1  Mar. 27, 2025

(51) Int. Cl.
G06F 15/177  (2006.01)
H04L 41/08  (2022.01)
H04L 41/0823  (2022.01)
H04L 41/0893  (2022.01)

(52) U.S. Cl.
CPC ...... H04L 41/0883 (2013.01); H04L 41/0836 (2013.01); H04L 41/0893 (2013.01)

(58) Field of Classification Search
CPC ............. H04L 41/0883; H04L 41/0836; H04L 41/0893
USPC ........................................................ 709/220
See application file for complete search history.

(56) References Cited

U.S. PATENT DOCUMENTS

| | | | |
|---|---|---|---|
| 5,802,333 A | 9/1998 | Melvin | |
| 7,466,653 B1 * | 12/2008 | Cohen | H04L 49/253 370/235 |
| 11,374,847 B1 | 6/2022 | Beacham | |
| 11,722,437 B2 | 8/2023 | Kaushik et al. | |
| 11,888,681 B1 * | 1/2024 | Khan | H04L 41/0663 |
| 2013/0262377 A1 | 10/2013 | Agarwal | |
| 2014/0362709 A1 * | 12/2014 | Kashyap | H04L 41/12 370/255 |
| 2017/0034023 A1 * | 2/2017 | Nickolov | H04L 43/0817 |
| 2019/0372884 A1 * | 12/2019 | Wackerly | H04L 49/25 |
| 2020/0311647 A1 | 10/2020 | Seshadri et al. | |
| 2023/0092836 A1 | 3/2023 | Koundinya et al. | |

OTHER PUBLICATIONS

"Operating Instructions: Sophos Switch Series," Sophos, Sophos Ltd., Dec. 28, 2022, pp. 1-12.
"Sophos Switch: Sophos Switch Series," Sophos, Sophos Ltd., Apr. 20, 2023, pp. 1-6.
"United Kingdom Combined Search and Examination Report under Sections 17 & 18(3)," United Kingdom Intellectual Property Office, Application No. GB2413161.7 Date of Report: Feb. 24, 2025, pp. 1-8.

* cited by examiner

Primary Examiner — Alan S Chou
(74) Attorney, Agent, or Firm — Cesari and McKenna, LLP; James A. Blanchette

(57) ABSTRACT

In one embodiment, techniques are provided to guide a user to configure a switch stack. A recommendation and guidance facility may identify one or more network switches to be added to the switch stack. It may further identify any existing connections among ports. Using this information, the recommendation and guidance facility may build a set of configurations for the switch stack. The recommendation and guidance facility may calculate a resiliency score, select a configuration based on the configuration's respective resiliency score, and display one or more stack connection recommendations that are implementable by a user to achieve the selected configuration and the possible resiliency score.

20 Claims, 18 Drawing Sheets

Switches
Overview > Switches

| Serial number | Alerts | Status | Last update | Version | Location | Ports | Connection us | IP address | Model | VLANs | Tags |
|---|---|---|---|---|---|---|---|---|---|---|---|
| > Default Template (0) | | | | | | | | | | | |
| ∨ Billerica (5) | | | | | | | | | | | |
| W1500162N8HHKA6 | ⚠7 | ● Unsynchronized | 8/18/2022 12:00 PM | 01.0.0980 | Stack-1... | 52 | 11 (21% used) | 192.168.1.138 | CS10... | 1 100 151 DATA |
| W1502KDFMKXC56 | ⚠5 | ✓ Synchronized | 8/18/2022 12:00 PM | 01.0.0980 | Stack-5 | 52 | 4 (8% used) | 192.168.1.159 | CS10... | 1 100 151 DATA |
| W1502KDFMKXC56 | ⚠5 | ✓ Synchronized | Just now | 01.0.0980 | Stack-4 | 12 | 9 (17% used) | 192.168.1.164 | CS10... | 1 100 151 DATA |
| W1501KDFMKXC56 | ⚠5 | ● Unsynchronized | Just now | 01.0.0980 | Stack-4 | 12 | 9 (17% used) | 192.168.1.164 | CS10... | 1 100 151 DATA |
| W1502KDVTCJC65 | ⚠5 | ✓ Synchronized | 8/18/2022 12:00 PM | 01.0.0980 | Stack-4 | 12 | 4 (8% used) | 192.168.1.164 | CS10... | 1 100 151 DATA |
| W1502KDVTCJC65 | ⚠5 | ✓ Synchronized | 8/18/2022 12:00 PM | 01.0.0980 | Stack-4 | 52 | 11 (21% used) | 192.168.1.164 | CS10... | 1 100 151 DATA |

FIG. 3B

FROM FIG. 4B

GUIDING CONFIGURATION OF A SWITCH STACK

BACKGROUND

Technical Field

The present application relates generally to switch stacking, and more specifically to techniques for configuring a switch stack.

Background Information

In networking, the term "switch stack" refers to a group of physical network switches that have been interconnected together and configured to operate as a single logical network switch. While composed of individual network switches, the switches of a switch stack are typically managed in a unified manner to operate as if they were part of the same network switch.

Ports of network switches of a switch stack may be configured with settings and connected to each other in various manners to produce different stack topologies. Such different configurations may provide different amounts of internal redundancy, excess capacity, distributed responsibility, or other qualities that yield different amounts of resiliency for the switch stack. However, when users configure a switch stack (e.g., connect new or existing switches together in a stack topology) they often have limited awareness of how their decisions will affect resiliency. Further, over the course of time, users may change connections between ports. Often users may not be fully aware of the impact of such changes on the resiliency of the switch stack, or on the possible resiliency of the switch stack.

Accordingly, there is a need for improved techniques for guiding configuration of a switch stack.

SUMMARY

In various example embodiments, improved techniques are provided to guide configuration of a switch stack. A recommendation and guidance facility may identify one or more network switches (e.g., new network switches or existing network switches already on a network) to be added to the switch stack. It may further identify any existing connections among ports. Using this information, the recommendation and guidance facility may build a set of configurations for the switch stack, where each configuration connects one or more ports of the one or more network switches to other ports of the one or more network switches or to ports of existing network switches that are already a part of the switch stack. The recommendation and guidance facility may calculate a resiliency score (i.e., a measure of resistance to and impact of failure of a component of the switch stack), and select a configuration based on the configuration's respective resiliency score (e.g., select the configuration having the greatest resiliency score). The recommendation and guidance facility may then display one or more stack connection recommendations that are implementable by a user to achieve the selected configuration (e.g., display recommendations for a stack topology to use, for ports to use, for connection speeds to use, for numbers of devices to connect, etc.) and the possible resiliency score that can be achieved.

In some embodiments, the recommendation and guidance facility may also detect when the stack connection recommendations have been implemented and may display an indication that the possible resiliency score has been achieved. Further, in some embodiments, the recommendation and guidance facility may provide reconfiguration recommendations for an already configured switch stack. For example, the recommendation and guidance facility may monitor the current resiliency score of the switch stack, and in response to the resiliency score meeting a criteria (e.g., falling below a threshold), build a reconfiguration for the switch stack, calculate a new resiliency score for the reconfiguration, and display one or more stack connection recommendations that are implementable to achieve the reconfiguration and the new resiliency score.

In contrast to traditional approaches in which users have relied upon general "rules of thumb", more resilient configurations for switch stacks can be achieved using the recommendation and guidance facility. Further, resiliency of switch stacks may be better maintained (or even improved) over time through monitoring and prompting a user to reconfigure.

In one example embodiment, a method is provided for guiding configuration of a switch stack. Software executing on a computing device identifies one or more network switches to be added to the switch stack and identifies any existing connections among ports of any existing network switches of the switch stack. It builds a plurality of configurations for the switch stack to connect one or more ports of the one or more network switches to other ports of the one or more network switches or to ports of any existing network switches of the switch stack. The software builds a resiliency score for each of the plurality of configurations, wherein the resiliency score is a measure of resistance to and impact of failure of a component of the switch stack and selects a configuration from the plurality based on the configuration's respective resiliency score. The software displays to the user one or more stack connection recommendations that are implementable to achieve the selected configuration and respective resiliency score.

In another example embodiment, a non-transitory computer readable medium is provided having software encoded thereon. The software when executed by one or more computing devices is operable to calculate a current resiliency score of a switch stack, wherein the current resiliency score is a measure of resistance to and impact of failure of a component of the switch stack, and to build a reconfiguration for the switch stack, wherein the reconfiguration includes a change to implement a different stack topology for the switch stack, to use a different stack connection port on a network switch of the switch stack, to use a different connection speed for a port for a network switch of the switch stack, or to use a different number of connected devices for a network switch of the switch stack. The software, when executed, is further operable to calculate a new resiliency score achievable by the reconfiguration, to compare the new resiliency score to the current resiliency score, and in response to the new resiliency score being greater than the current resiliency score, to display to a user one or more stack connection recommendations that are implementable to achieve the reconfiguration and new resiliency score.

In yet another example embodiment, an apparatus is provided for guiding configuration of a switch stack. The apparatus includes one or more processors and one or more memories coupled to the one or more processors. The one or more memories are configured to store software that, when executed on the one or more processors, is operable to identify one or more network switches to be added to the switch stack, identify any existing connections among ports of any existing network switches of the switch stack, build a configuration for the switch stack to connect one or more ports of the one or more network switches to other ports of the one or more network switches or to ports of any existing network switches of the switch stack, and calculate a resiliency score for the configuration, wherein the resiliency score is a measure of resistance to and impact of failure of a component of the switch stack. The software, when executed, is further operable to select the configuration based on the configuration's resiliency score, display one or more stack connection recommendations that are implementable to achieve the configuration and the configuration's resiliency score, detect that the one or more stack connection recommendations have been implemented; and display the configuration resiliency score as a current resiliency score of the switch stack.

It should be understood that a wide variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which:

FIG. 3B is an example screen of a user interface of a recommendation and guidance facility that may be used as part of identifying existing network switches to be added to a switch stack;

FIGS. 4B and 4C are together an example screen of a user interface of a recommendation and guidance facility that may be used to show ports of existing network switches and existing connections among ports;

FIG. 5A is an example screen of a user interface of a recommendation and guidance facility that shows one or more stack connection recommendations that are implementable to achieve an automatically selected configuration;

FIGS. 5B and 5C are together an example screen of a user interface of a recommendation and guidance facility that shows one or more stack connection recommendations whose selection by a user selects a configuration;

DETAILED DESCRIPTION

The following detailed description describes example embodiments. Any documents mentioned herein should be considered to be incorporated by reference in their entirety. Any references to items in the singular should be understood to include items in the plural, and vice versa, unless explicitly stated otherwise or otherwise clear from the context. Grammatical conjunctions are generally intended to express any and all disjunctive and conjunctive combinations of conjoined clauses, sentences, words, and the like, unless otherwise stated or clear from the context. For example, the term "or" should generally be understood to mean "and/or."

Any recitation of ranges of values are not intended to be limiting, are provided as example only, and are not intended to constitute a limitation on the scope of the described embodiments. Further, any recitation of ranges should be interpreted as referring individually to any and all values falling within the range, unless otherwise indicated, and each separate value within such a range should be treated as if it were individually recited. Terms of approximation such as "about," "approximately," "substantially" or the like, should be construed as referring to an allowance for deviation that is appreciated by one of ordinary skill in the art to still permit satisfactory operation for the corresponding use, function, purpose, or the like. Terms of relative ordering or orientation, such as "first," "last," "greatest", "smallest", "top," "bottom," "up," "down," and the like, should be understood to be used relative to a standard of comparison or perspective, and do not preclude differing orderings or orientations based on different standards of comparison or perspectives. No language in the description should be construed as indicating that an element is a necessary or essential aspect of the disclosure.

Figure 1:
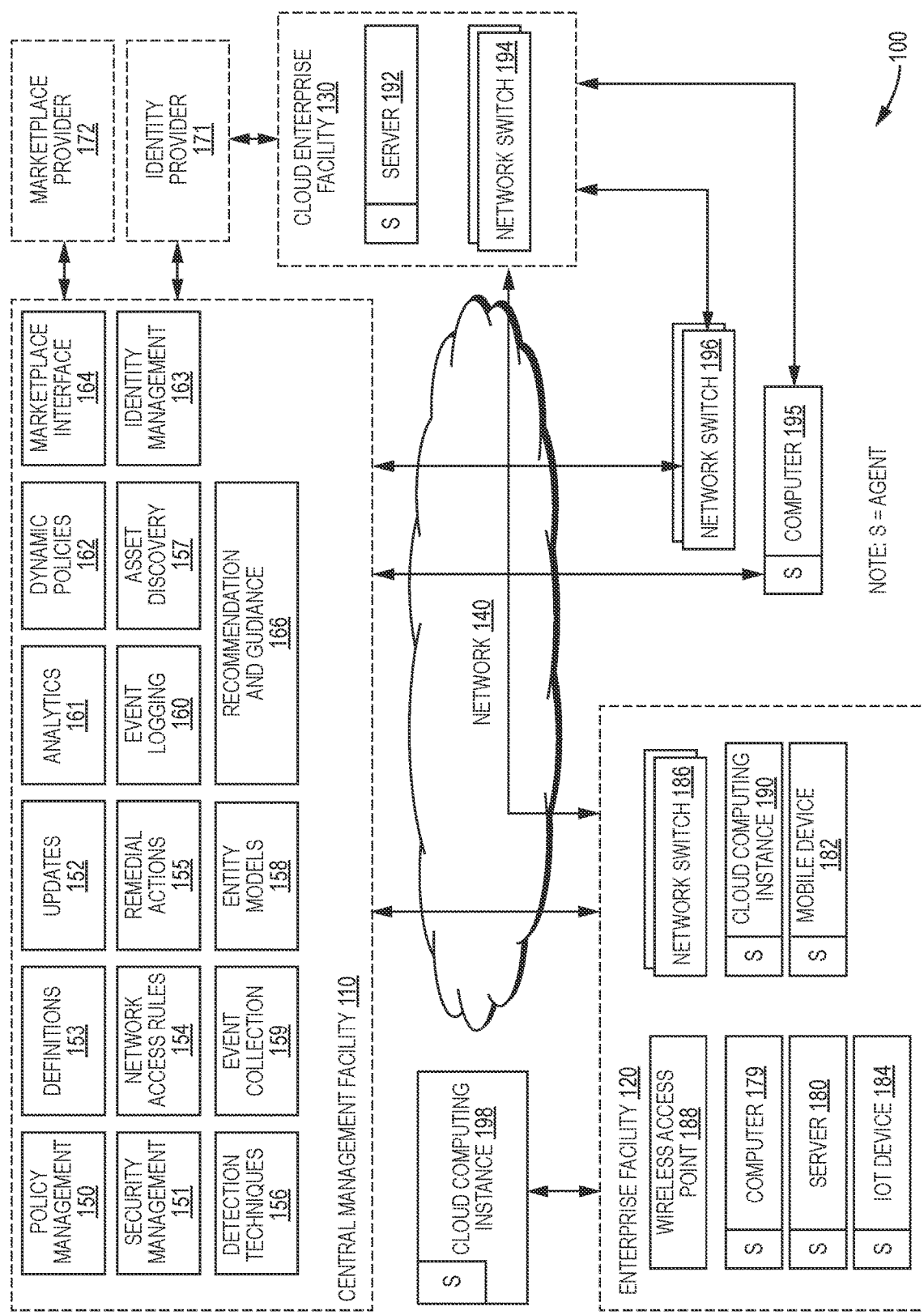
FIG. 1 is a block diagram of an example system in which a central management facility may be used to communicate with, coordinate, and control operation of compute instances and networks, including network switches of a switch stack.

FIG. 1 is a block diagram of an example system 100 in which a central management facility 110 may be used to communicate with, coordinate, and control operation of compute instances and networks, including network switches of a switch stack. As used herein, the term "compute instance" refers to a computing device (e.g., an endpoint, network device, or sub-component thereof), or a virtual machine (e.g., a cloud computing instance) executing on a computing device (e.g., a cloud-based or local server). A network switch is an example of a network device that may be more generally considered a compute instance. Compute instances may be within an enterprise facility 120, cloud enterprise facility 130, or external to such facilities 120, 130. In this context, being "within" a facility 120, 130 refers to being on the local area network (LAN) of the facility 120, 130 (e.g., inside the gateway) or being more generally associated with the facility 120, 130 (e.g., outside the gateway but nonetheless managed by, or in communication with, devices of the facility).

Looking to the central management facility 110 in more detail, the facility 110 may include a number of sub-facilities (in this context, processes or other software that perform functions) such as a policy management facility 150, security management facility 151, update facility 152, definitions facility 153, network access rules facility 154, remedial actions facility 155, detection techniques facility 156, asset discovery facility 157, entity model facility 158, event collection facility 159, event logging facility 160, analytics facility 161, dynamic policies facility 162, identity management facility 163, marketplace interface facility 164, and a recommendation and guidance facility 166, as well as other facilities. The central management facility 110 and its sub-facilities 150-166 may be executed, in whole or in part, on one or more compute instances in a single or different locations. For example, some portion of the central management facility 110 or its sub-facilities 150-166 may be executed on a cloud platform that includes cloud-based servers or other cloud-based computing devices, while other portions may be executed on endpoints, network devices or virtual machines of an enterprise facility 120 or cloud enterprise facility 130, or external to such facilities 120, 130. In some cases, the central management facility 110 or its sub-facilities 150-166 may be integrated into (e.g., deployed in) an agent S that is executed by a compute instance (or in some cases physical hardware of a compute instance) of an enterprise facility 120 or cloud enterprise facility 130, or external to such facilities 120, 130. Accordingly, while FIG. 1 shows the central management facility 110 and its sub-facilities 150-166 as separate from the endpoints, network devices and virtual machines of an enterprise facility 120 or cloud enterprise facility 130, or endpoints, network devices and virtual machines external to such facilities 120, 130, it should be understood that such separation is merely to permit visual representation.

Each facility 150-166 may provide a respective function. The policy management facility 150 may manage rules or policies, for example, access permissions for networks, applications, compute instances, users, data, and the like. The security management facility 151 may provide malicious code protection, email security and control, web security and control, network access control, host intrusion prevention, reputation filtering, as well as other functions. The update facility 152 may provide control over when updates are performed, for example, receiving updates from a provider, and distributing the updates to compute instances and networks. The definitions facility 153 may maintain information about threats. The network access rules facility 154 may provide access restrictions to applications, networks, endpoints, data, users, etc. The remedial actions facility 155 may perform measures to address a threat or policy violation detected by another facility. The detection techniques facility 156 may provide threat detection and investigation techniques used by the security management facility 151 and other facilities. The asset discovery facility 157 may provide an asset discovery service to determine assets (e.g., endpoints, network devices and virtual machines) present in an enterprise facility 120, cloud enterprise facility 130, or external to such facilities 120, 130 and the configuration thereof. As explained further below, one specific task that may be performed by the asset discover facility 157 is to identify network switches and connections among ports of network switches.

The entity models facility 158 may collect information used to determine events occurring on asset. The event collection facility 159 may identify the occurrence of particular events based on information from sensors that monitor assets. The event logging facility 160 may store (e.g., locally and/or in cloud-based storage) events collected by the event collection facility 159. The analytics facility 161 may make inferences and observations about the events, as part of policies enforced by the security management facility 151 or other facilities, which may be stored by the event logging facility 160. The dynamic policies facility 162 may generate policies dynamically based on observations and inferences made by the analytics facility 161. The identity management facility 163 may operate in conjunction with a remote identity provider 171 to confirm identity of a user. The identity provider 171 may determine a risk score for a user and take steps to address any potential risk. The marketplace interface facility 164 may operate in conjunction with a marketplace provider 172 to provide additional functionality or capabilities to the central management facility 110. The interface facility 164 may provide notifications of events to the marketplace provider 172. The recommendation and guidance facility 166 may provide device control and user instructions to configure compute instances, including endpoints, network devices and virtual machines. As explained further below, one specific task that may be performed by the recommendation and guidance facility 166 is to guide configuration of a switch stack, using in part information from the asset discover facility 157 describing identified network switches and connections among ports of network switches.

Looking to the enterprise facility 120 in more detail, it should be understood that the enterprise facility 120 includes a collection of networked computer-based infrastructure. For example, the enterprise facility 120 may be a corporate, commercial, organizational, educational, or governmental computer network. Likewise, as home networks are becoming more complex, the enterprise facility 120 may alternatively be a home network or a network that covers a group of homes. The enterprise facility 120 may include a number of compute instances, including endpoints, network devices and virtual machines. The endpoints may include individual computers 179, servers 180, mobile devices 182, Internet appliances or Internet-of-Things (IOT) devices 184 or other physical devices that connect to and exchange information with a network. The network devices may include network switches 186, wireless access points 188, gateways, or other physical devices that are required for communication and interaction between hardware on a network. At least some of the network switches 186 may be organized, or may be desired to be organized, into switch stacks. The virtual machines may include cloud computing instances 190 or other computing environments created by abstracting resources from a physical device. The virtual machines may be executed on hardware distributed amongst a plurality of physical premises. In general, it should be understood that that the compute instances shown in FIG. 1 of the enterprise facility 120 are merely examples, and that the compute instances of an enterprise facility 120 may include a wide variety of types of endpoints, network devices and virtual machines.

Looking to the cloud enterprise facility 130 in more detail, it should be understood that the cloud enterprise facility 120 includes a collection of cloud-based infrastructure. The cloud enterprise facility 120 may provide software as a service (SaaS), platform as a service (PaaS), Infrastructure as a Service (IaaS) or other cloud computing functions to compute instances and networks within the enterprise facility 120 or external to such facility. The cloud enterprise facility 120 may include a number of compute instances, including endpoints, network devices and virtual machines. For example, the cloud enterprise facility 130 may include servers 192, network switches 194, as well as other physical devices. At least some of the network switches 194 may be organized, or may be desired to be organized, into switch stacks. It should be understood that the compute instances shown in FIG. 1 inside the cloud enterprise facility 130 are merely examples and that the compute instances of a cloud enterprise facility 130 may include a wide variety of types of endpoints, network devices and virtual machines.

Looking to the compute instances and networks external to the enterprise facility 120 and cloud enterprise facility 130 in more detail, it should be understood that the external compute instances may similarly include a number of endpoints, network devices, virtual machines, and the like. For example, the external compute instances may include individual computers 195, network switches 196 and cloud computing instances 198 as well as other physical devices or virtual machines. At least some of the network switches 194 may be organized, or may be desired to be organized, into switch stacks. The external compute instances may use network connectivity not directly associated with or controlled by the enterprise facility 120 or the cloud enterprise facility 130.

Utilizing switch stacks can simplify network management. Rather than separately managing multiple individual network switches, a user can manage an entire switch stack at the same time. For example, a single media access control (MAC) table is typically maintained for an entire switch stack, a single management Internet Protocol (IP) address is typically used to manage an entire switch stack, various network protocol such as spanning tree protocol (STP), Open Shortest Path First (OSPF) protocol, and the like typically treat a switch stack as a single device, virtual local area network (VLAN) management typically is performed across an entire switch stack, etc. Likewise, utilizing switch stacks can improve network reliability and flexibility. For example, if a component of a switch stack (e.g., a link, a port, a network switch, etc.) fails, the switch stack may have sufficient resiliency to continue operation without significant service disruption. In the context of a switch stack, the term "resiliency" refers to the ability to resist, or to minimize the impact of, failure of a component of the switch stack.

Ports of network switches of a switch stack may be configured with settings and connected to each other using one or more twisted pair Ethernet cables, fiber optic cables, specialized stacking cables (e.g., Direct Attach Copper cables) or other types of links. In some cases, link aggregation may be employed to provide greater redundancy and/or bandwidth between switches (or other devices). The connections may produce a stack topology (e.g., a chain topology in which each network switch is connected to at least one neighboring network switch but there is no connection between a first and a last network switch, a ring topology in which each network switch is connected to at least one neighboring network switch and there is a connection between a first network switch and a last network switch, or other topology). Collectively the connections between ports, the settings of such ports, and the stack topology produced may be referred to as a "configuration" of the switch stack.

Figure 2:
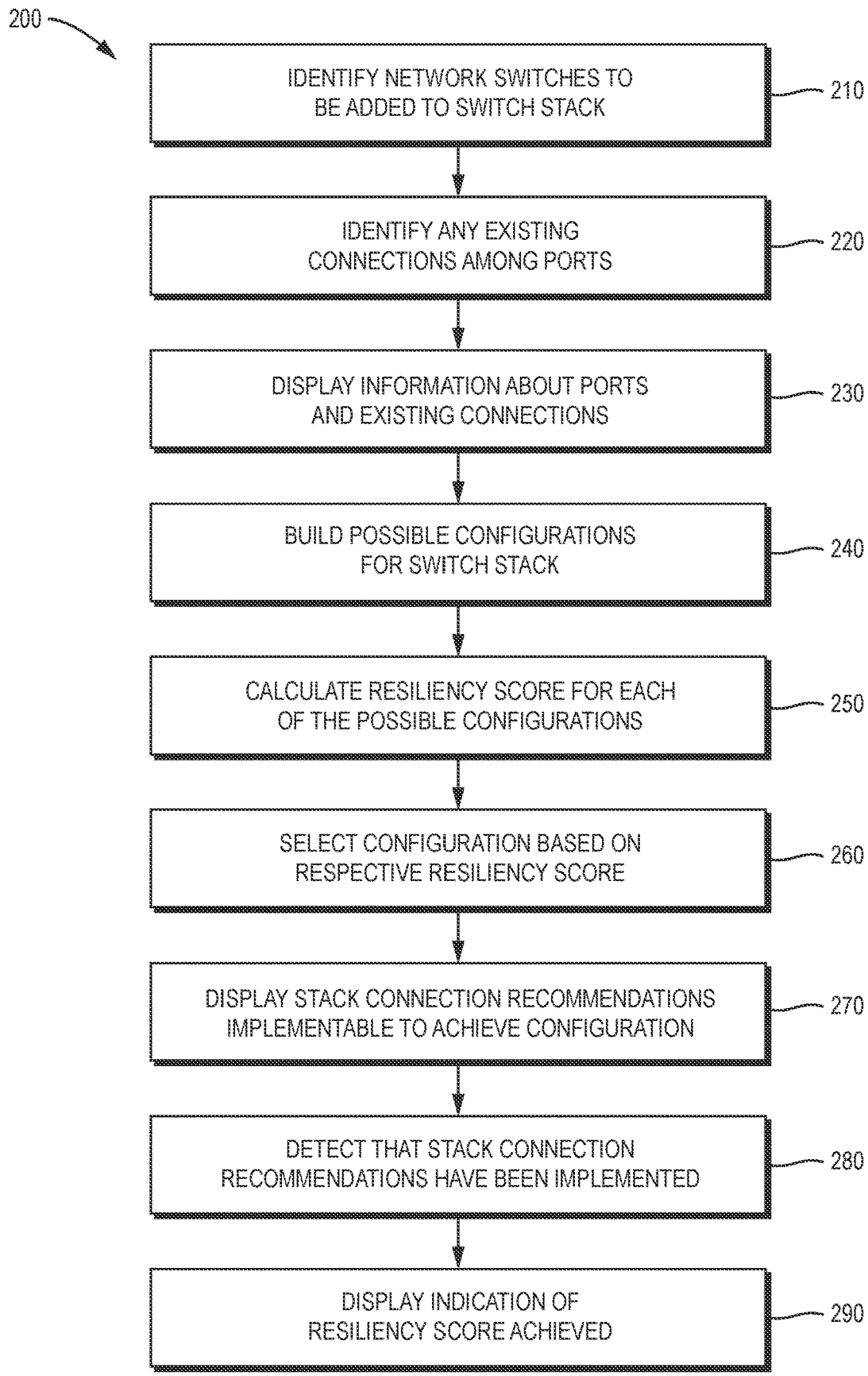
FIG. 2 is flow diagram of an example sequence of steps that may be implemented by a recommendation and guidance facility (working with other facilities) to guide configuration of a switch stack.

FIG. 2 is flow diagram of an example sequence of steps 200 that may be implemented by the recommendation and guidance facility 166 (working with other facilities) to guide configuration of a switch stack. At step 210, the recommendation and guidance facility 166 identifies one or more network switches 186, 194, 196 to be added to the switch stack. The network switches may be new network switches that are initially not connected to a network (e.g., the Internet), or may be existing network switches that are already coupled to a networked. In the case of new network switches, the recommendation and guidance facility 166 may display in its user interface a prompt for the user to connect the one or more new network switches to the network, and to establish communication between the new network switches and the central management facility 110.

Figure 3A:
FIG. 3A is an example screen of a user interface of a recommendation and guidance facility that may be used as part of identifying new network switches to be added to a switch stack.

FIG. 3A is an example screen 300 of a user interface of a recommendation and guidance facility 166 that may be used as part of identifying new network switches to be added to a switch stack. In area 310 the user is prompted to connect the new network switches to the network (e.g., the Internet). Once connected to the network, the new network switches may be discovered by the asset discovery facility 157 using a device discovery protocol (e.g., Simple Network Management Protocol (SNMP), Layer Discovery Protocol (LLDP), etc.) and communication established between them and the central management facility 110. In area 320, the user is prompted to enter a serial number of each of the new network switches to add to the switch stack.

In the case of existing network switches, the recommendation and guidance facility 166 may display in its user interface a list of network switches in communication with the central management facility 110 and prompt a user to select one or more network switches from the list to add to the switch stack.

FIG. 3B is an example screen 350 of a user interface of a recommendation and guidance facility 166 that may be used as part of identifying existing network switches to be added to a switch stack. In area 360, the user is displayed a list of existing network switches in communication with the central management facility 110. The existing network switches may be grouped by physical location. Using interface elements (e.g., checkboxes) 370 the user may select one or more network switches from the list to add to the switch stack.

At step 220, the recommendation and guidance facility 166 identifies any existing connections among port of any existing network switches of the switch stack. The recommendation and guidance facility 166 may communicate with the asset discovery facility 157, which may discover the existing connections using a discovery protocol (e.g., SNMP, LLDP, etc.).

At step 230, the recommendation and guidance facility 166 displays information in its user interface describing the ports of network switches (e.g., new network switches and/or existing network switches) of the switch stack, and any existing connections among ports. This information may include graphics showing the network switches, ports, and any existing connections.

Figure 4A:
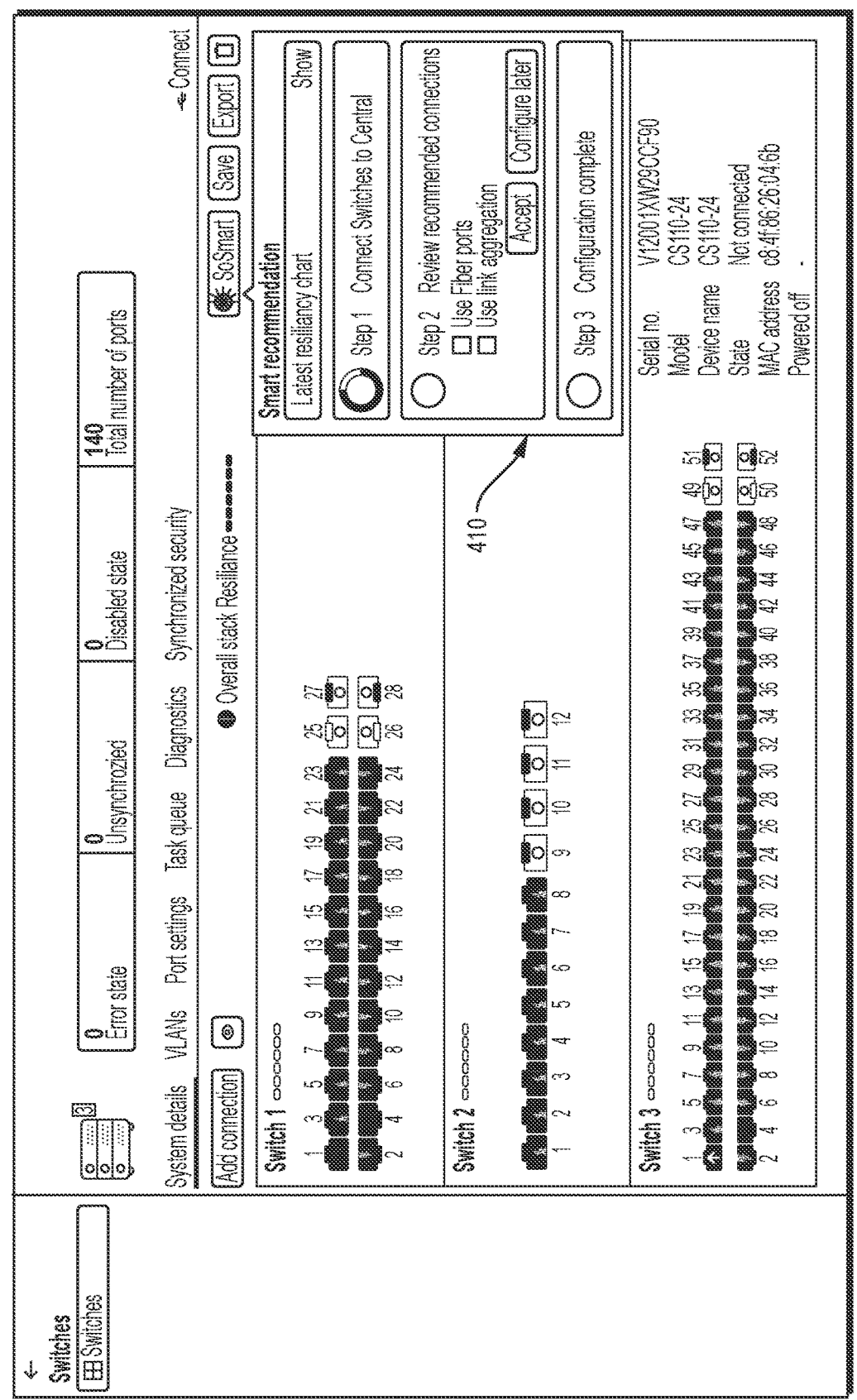
FIG. 4A is an example screen of a user interface of a recommendation and guidance facility that may be used to show ports of new network switches.

FIG. 4A is an example screen 400 of a user interface of a recommendation and guidance facility 166 that may be used to show ports of new network switches (here three new network switches). The ports may be differentiated (e.g., color coded) to indicate respective types (e.g., Ethernet ports, fiber optic ports, etc.). A part 410 of screen 400 may prompt a user to make selections about types of ports to be used to interconnect network switches of the switch stack (e.g., use fiber optic ports) or types of interconnections to utilize (e.g., use link aggregation).

Figure 4B:
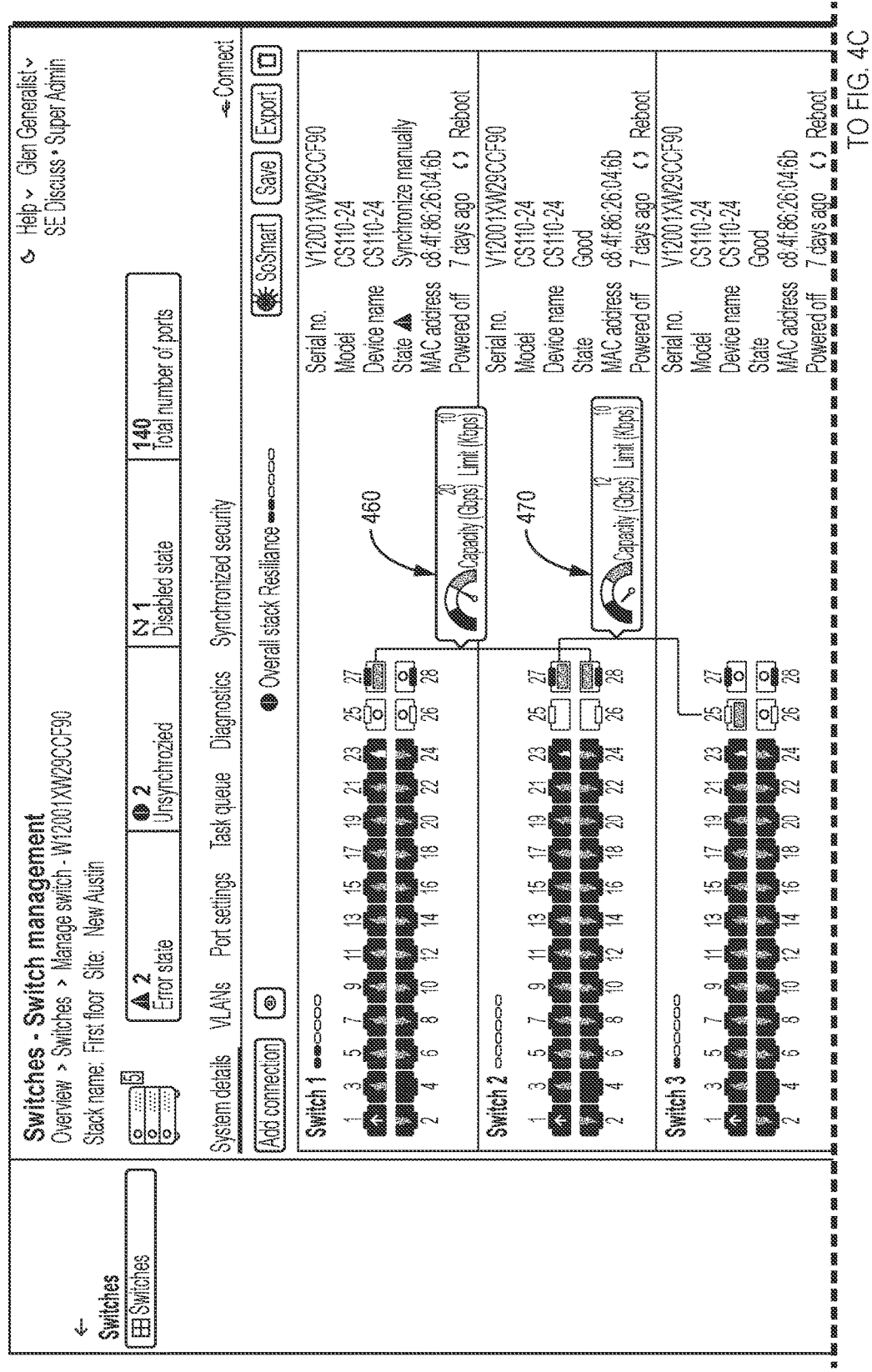
Figure 4C:
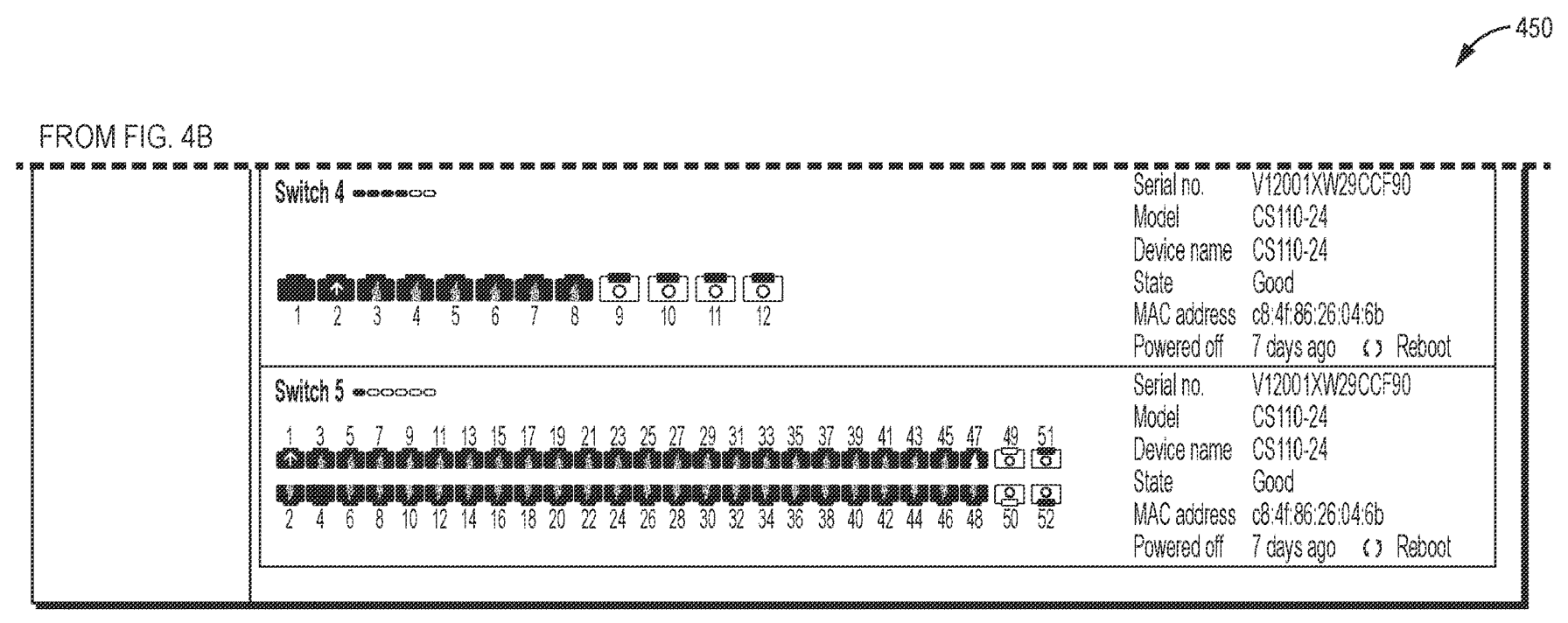

FIGS. 4B and 4C are together an example screen 450 of a user interface of a recommendation and guidance facility 166 that may be used to show ports of existing network switches (here five existing network switches) and existing connections among ports. Again, the ports may be differentiated (e.g., color coded) to indicate respective types (e.g., Ethernet ports, fiber optic ports, etc.). Information 460, 470 concerning existing connections (e.g., capacity, rate limit, etc.) may be displayed together with indications of the existing connections.

At step 240, the recommendation and guidance facility 166 builds one or more possible configurations for the switch stack to connect one or more ports of the one or more network switches to other ports of the one or more network switches or to ports of any existing network switches of the switch stack. The possible configurations may be built using a configuration generation algorithm that generations configurations that are likely to have improved resiliency over a current configuration of the switch stack (if any). Further details of an example configuration generation algorithm that may be employed as part of step 240 are provided below in connection with FIG. 8.

At step 250, the recommendation and guidance facility 166 calculates a resiliency score for each of the plurality of configurations, wherein the resiliency score is a measure of resistance to and impact of failure of a component of the switch stack. As part of the calculation, the recommendation and guidance facility 166 may determine an individual resiliency score of each network switch of the switch stack in the configuration, to produce a set of resilience scores, and use a lowest individual resiliency score from the set as the resiliency score of the switch stack. In one implementation, each individual resiliency score may be determined using a resiliency score calculation algorithm. Details of an example resiliency score calculation algorithm that may be employed as part of step 250 are provided below in connection with FIG. 9.

At step 260, a configuration is selected from the one or more possible configurations for the switch stack based on the configuration's respective resiliency score. The selected configuration may be the configuration having a greatest resiliency score, or a configuration having a resiliency score that is better (e.g., is greater) than a given threshold.

At step 270, the recommendation and guidance facility 166 displays one or more stack connection recommendations that are implementable to achieve the selected configuration and respective resiliency score, together with an indication of the respective resiliency score that may be achieved. The stack connection recommendations may include recommendations for a stack topology to use, for ports to use, for connection speeds to use, for numbers of devices to connect, etc. The indication of the possible resiliency score that can be achieved may be a graphical indication (such as a number of bars), a numerical indication, or some other type of indication. The stack connection recommendations may suggest forming entirely new connections. Alternatively, the stack connection recommendations may suggest changing existing connections.

Depending on the embodiment, steps 260 and 270 may be performed separately or in a combined manner. For example, in one embodiment, the selection of step 260 may be performed first by the recommendation and guidance facility 166, for example, by automatically selecting the possible configuration having a greatest resiliency score. Thereafter, the recommendation and guidance facility 166 may display at step 270 one or more stack connection recommendations that are implementable to achieve the already selected configuration, together with an indication of the resiliency score that may be achieved if they are implemented.

In some cases, one or more text explanations may be displayed by the recommendation and guidance facility 166 together with the one or more stack connection recommendations. The recommendation and guidance facility 166 may maintain a library of predetermined text explanations, each associated with a type of connection recommendation. For each stack connection recommendation, the recommendation and guidance facility 166 may locate and access a text explanation from the library that correspond to a corresponding type and display it in its user interface.

Figure 5A:
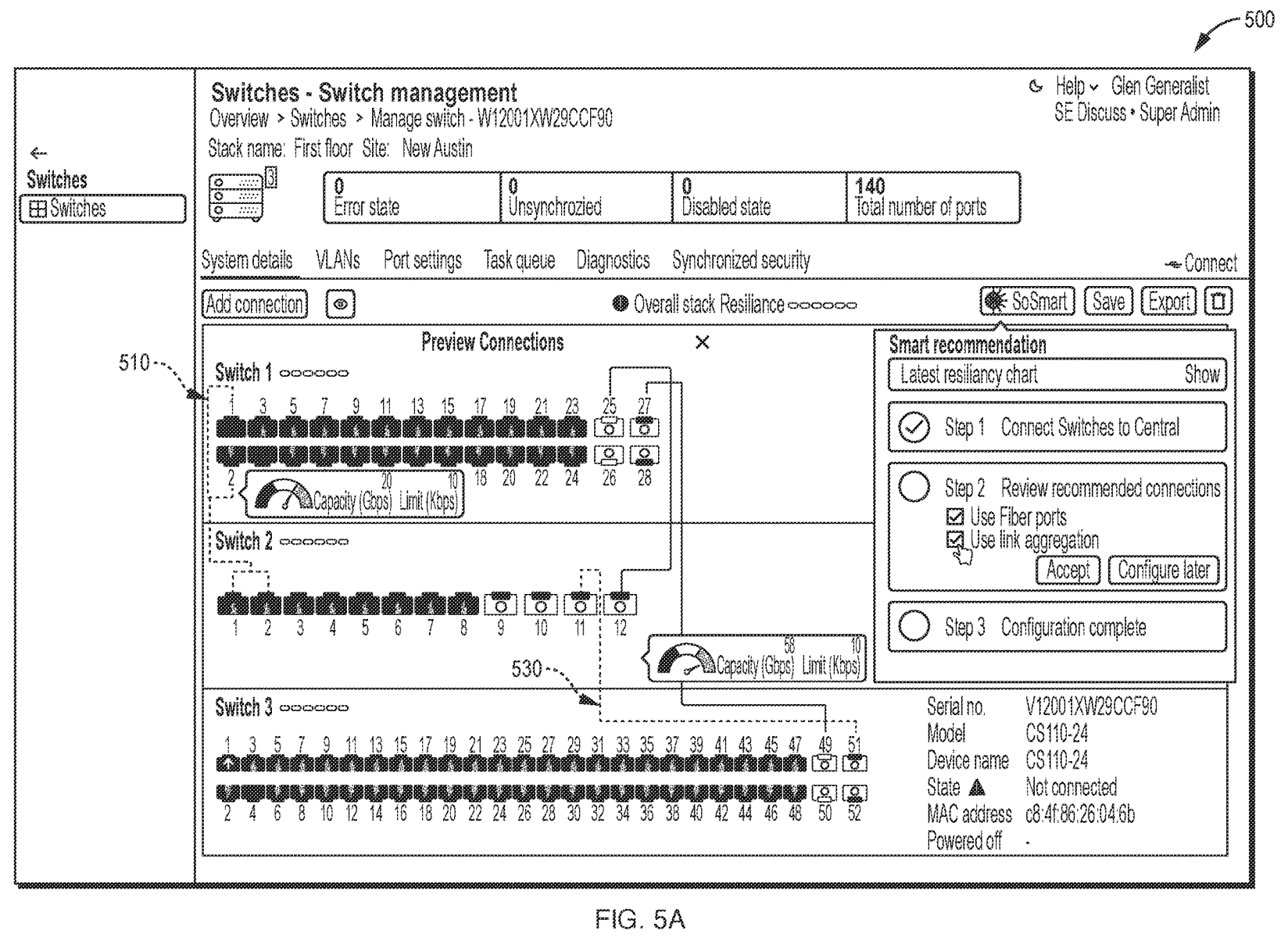

FIG. 5A is an example screen 500 of a user interface of a recommendation and guidance facility 166 that shows one or more stack connection recommendations that are implementable to achieve an automatically selected configuration. In this example, one stack connection recommendation 510 suggests connecting particular ports to a first and second network switch (with link aggregation), and another stack connection recommendation 520 suggests connecting ports of a second and third network switch. If these stack connection recommendations are implemented, the resiliency score may be archived.

Alternatively, in another embodiment, the selection of step 260 may be performed in combination (e.g., simultaneously) with the display of stack connection recommendations of step 270. For example, the recommendation and guidance facility 166 may determine a set of possible configurations that each have a resiliency score that is better (e.g., is greater) than a given threshold. One or more stack connection recommendations that are implementable to achieve them may be displayed together with the respective resiliency score that may be achieved if implemented. The user may be prompted to select one or more stack connection recommendations to implement a desired configuration. In such manner, the configuration is selected from the set of possible configurations in response to user input, as a result of selection of stack connection recommendations.

Figure 5B:
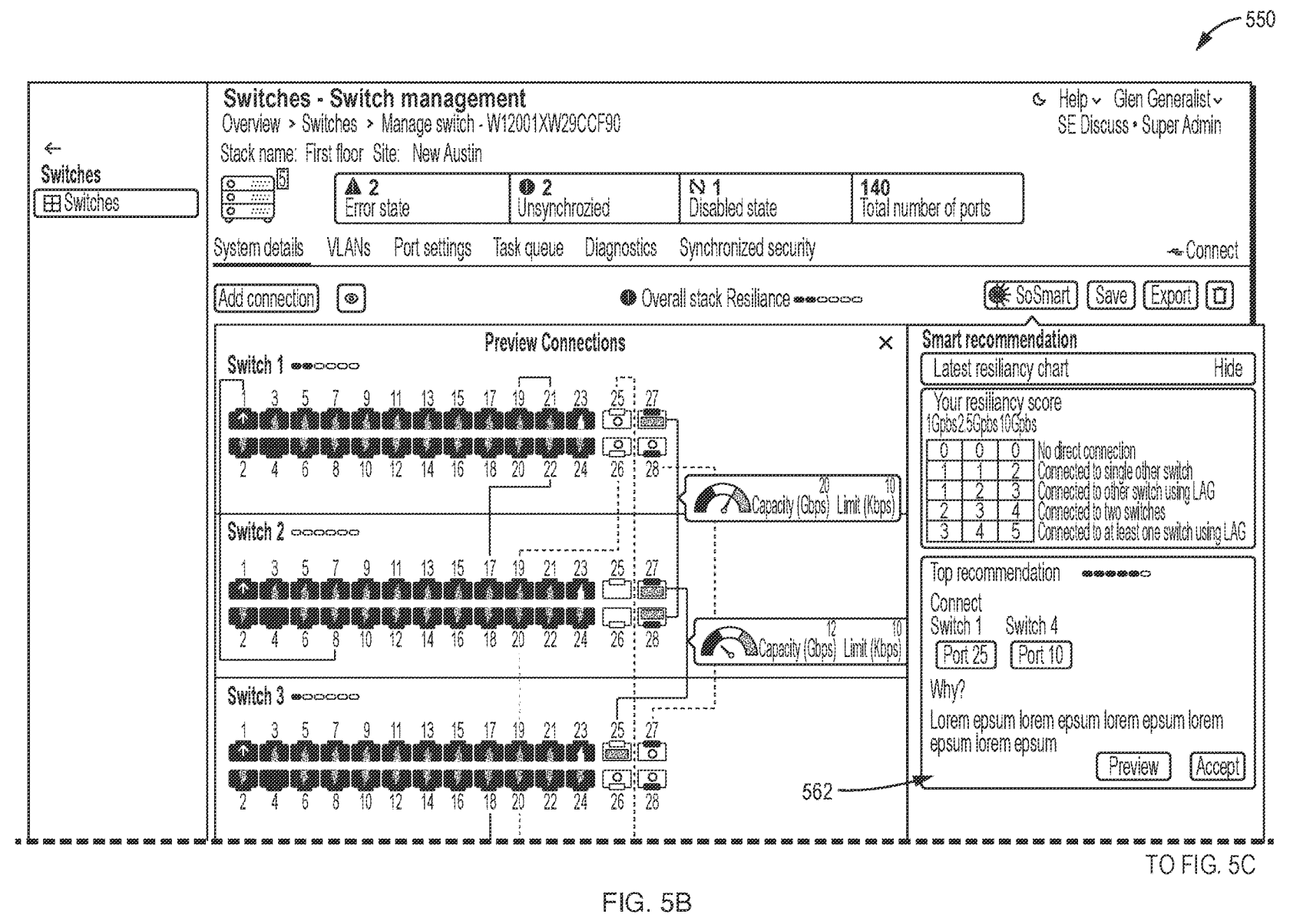
Figure 5C:
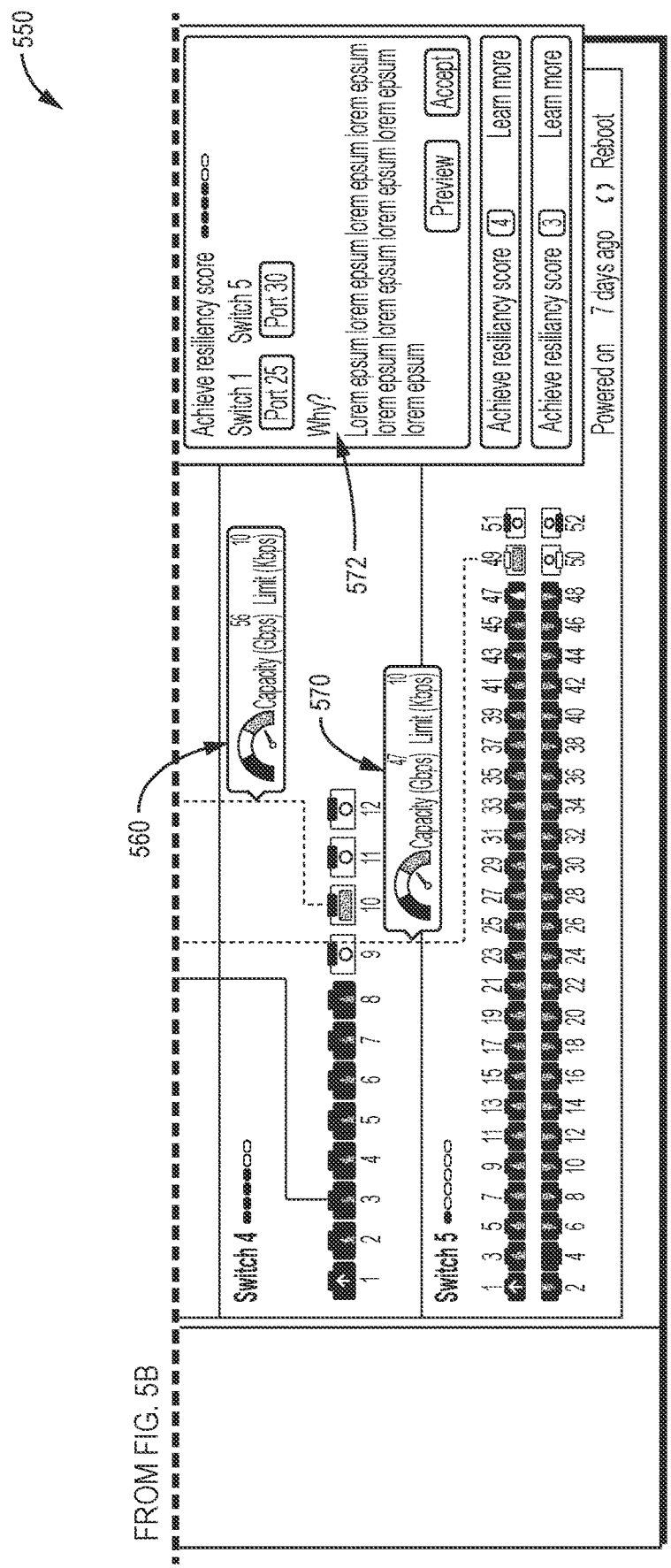

FIGS. 5B and 5C are together an example screen 550 of a user interface of a recommendation and guidance facility 166 that shows one or more stack connection recommendations whose selection by a user selects a configuration. In this example, one stack connection recommendation (having both graphical and text explanation components) 560, 562 suggests connecting particular ports of a first and fourth network switch and another stack connection recommendation (having both graphical and text explanation components) 570, 572 suggests connecting ports of a first and fifth network switch. The user is prompted to accept the stack connection recommendations (e.g., by selecting an "Accept" button associated therewith) in the user interface, which thereby selects the configuration they will implement for the switch stack.

At step 280, the recommendation and guidance facility 166 utilizes the asset discovery facility 157 to detect that the one or more stack connection recommendations have been implemented. The asset discovery facility 157 may utilize a device discovery protocol (e.g., SNMP, LLDP, etc.) to perform such detection.

At step 290, the recommendation and guidance facility 166 displays an indication (e.g., a graphical indication, a numerical indication, etc.) of the resiliency score achieved by implementing the stack connection recommendations. This is now the current resiliency score of the switch stack. The recommendation and guidance facility 166 may also display components of the resiliency score, for example, indications of individual resiliency scores for each network switch of the switch stack, and information describing factors that contribute to the resiliency score of the switch stack, for example, a resiliency chart which shows some factors that affect scores.

Figure 6A:
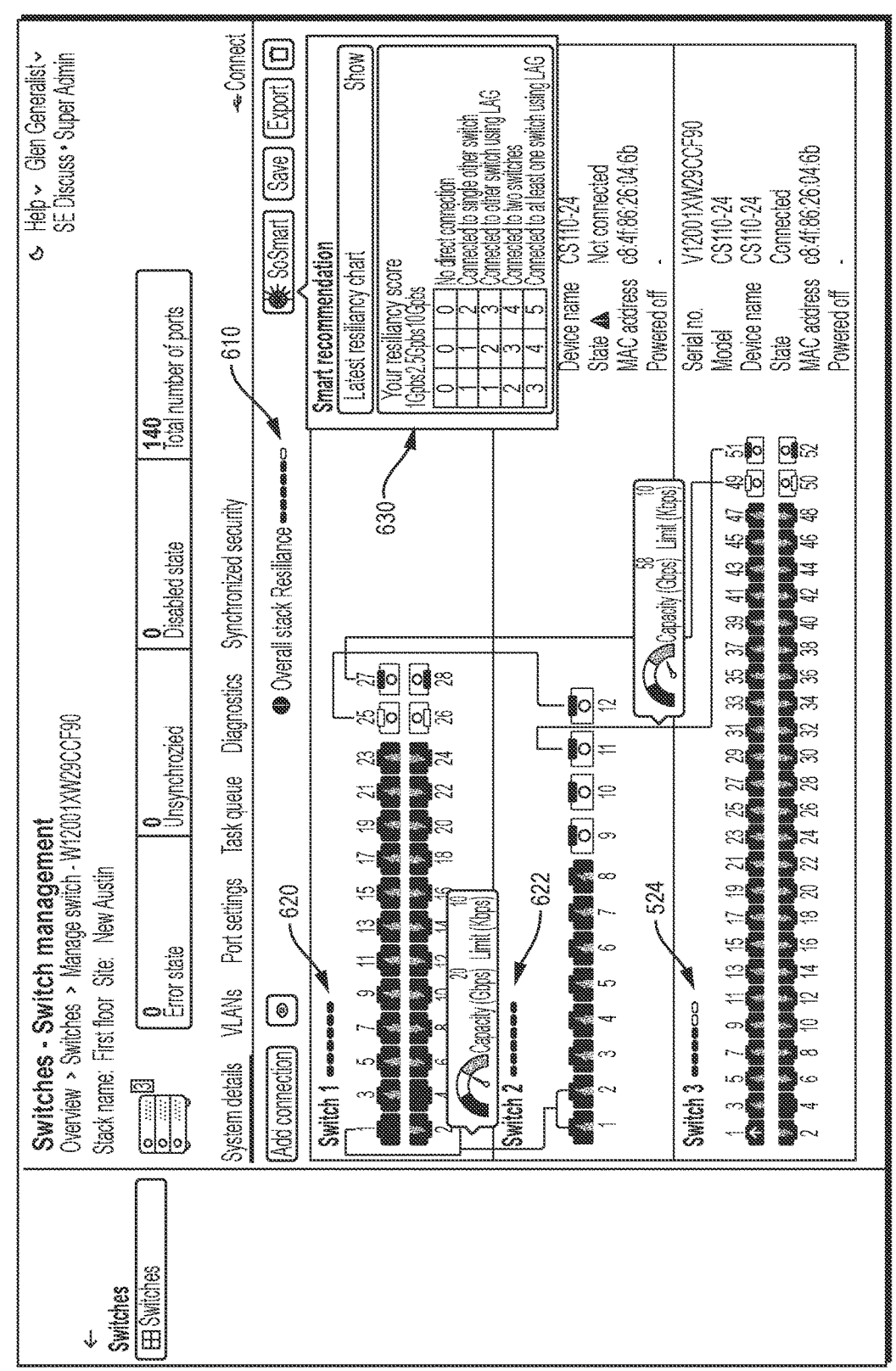
FIG. 6A is an example screen of a user interface of a recommendation and guidance facility that shows a graphical indication of the current resiliency score of a switch stack resulting from implementing one or more stack connection recommendations.

FIG. 6A is an example screen 600 of a user interface of a recommendation and guidance facility 166 that shows a graphical indication of the current resiliency score 610 of a switch stack resulting from implementing one or more stack connection recommendations. Further, indications of individual resiliency scores 620-624 are shown for three network switch of the switch stack, as well as a resiliency chart 630 that provides an indication of the effects of capacity and number/type of connections on resiliency scores.

Figure 6B:
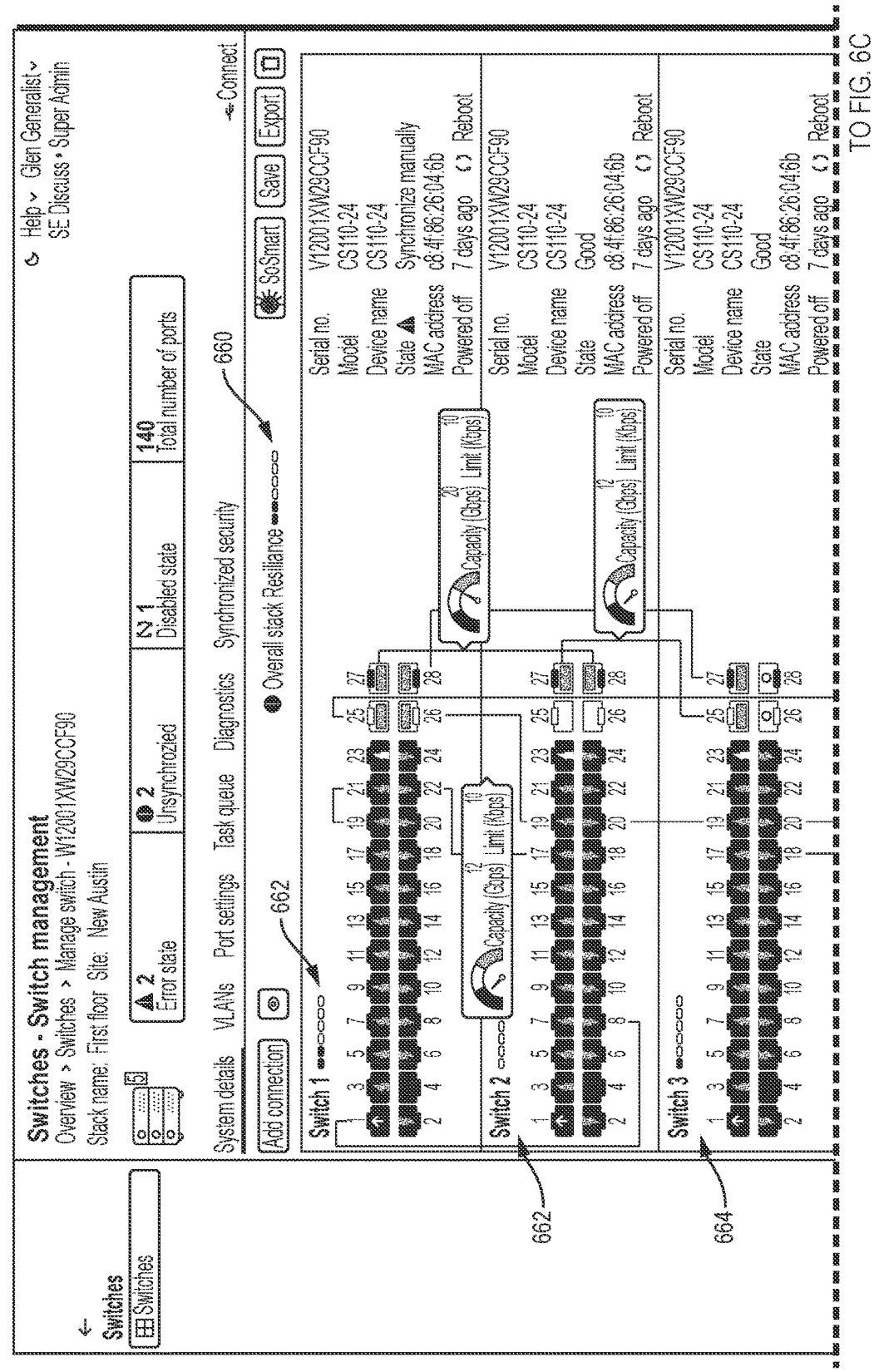
FIGS. 6B and 6C are together an example screen of a user interface of a recommendation and guidance facility that shows a graphical indication of the current resiliency score of a switch stack resulting from implementing one or more stack connection recommendations.
Figure 6C:
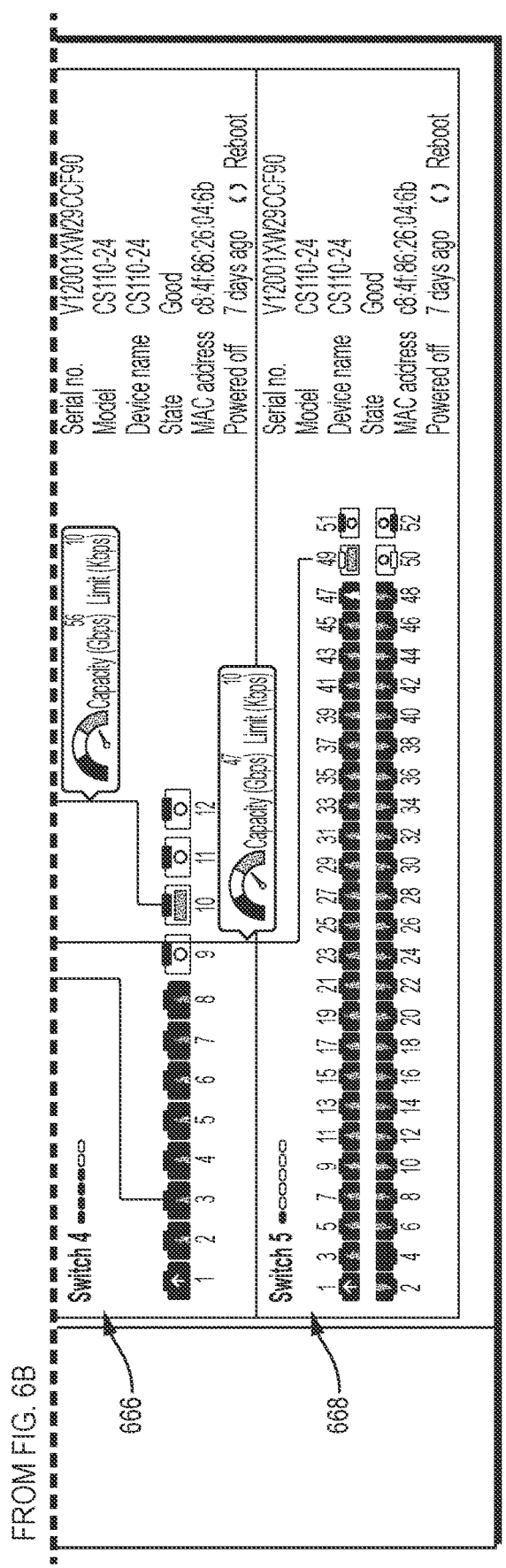

Similarly, FIGS. 6B and 6C are together an example screen 650 of a user interface of a recommendation and guidance facility 166 that shows a graphical indication of the current resiliency score 660 of a switch stack resulting from implementing one or more stack connection recommendations. Indications of individual resiliency scores 660-668 are shown for five network switches of the switch stack.

Figure 7:
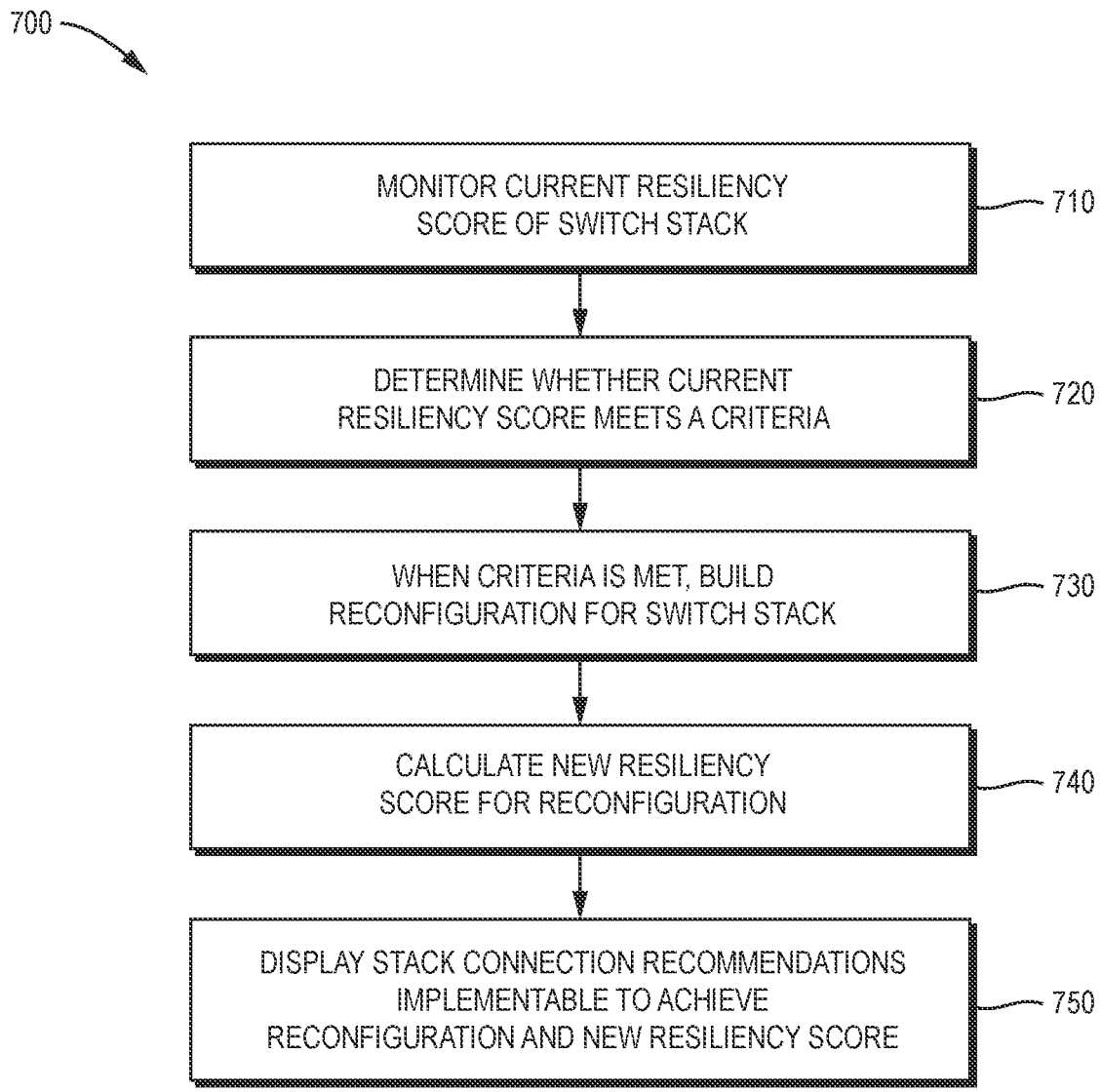
FIG. 7 is a flow diagram of an example sequence of steps that may be implemented by a recommendation and guidance facility (working with other facilities) to guide reconfiguration of a switch stack.

In addition to initial configuration, the recommendation and guidance facility 166 may monitor a switch stack over time and provide reconfiguration recommendations. FIG. 7 is a flow diagram of an example sequence of steps 700 that may be implemented by the recommendation and guidance facility 166 (working with other facilities) to guide reconfiguration of a switch stack. At step 710, the recommendation and guidance facility 166 monitors the current resiliency score of the switch stack. The monitoring may be performed by periodically recalculating the resiliency score using the example resiliency score calculation algorithm described below in connection with FIG. 9.

At step 720, the recommendation and guidance facility 166 determines whether the current resiliency score meets a criterion. For example, the criterion may be that the current resiliency score is lower than a threshold. The threshold may be a user provided value (e.g., specified by a user in the user interface of the recommendation and guidance facility 166, a default value coded into the recommendation and guidance facility 166, or other value. When the criterion is met, at step 730, the recommendation and guidance facility 166 proceeds to build at least one reconfiguration for the switch stack. Each reconfiguration may be built using the example configuration generation algorithm described below in connection with FIG. 8. Further, at step 740, the recommendation and guidance facility 166 calculates a new resiliency score for each reconfiguration. This may be performed using the example resiliency score calculation algorithm described below in connection with FIG. 9. At step 750, the recommendation and guidance facility 166 displays in its user interface one or more stack connection recommendations that are implementable to achieve the reconfiguration and the new resiliency score. The display may involve showing screens similar to FIGS. 5A and 5B, discussed above.

Figure 8:
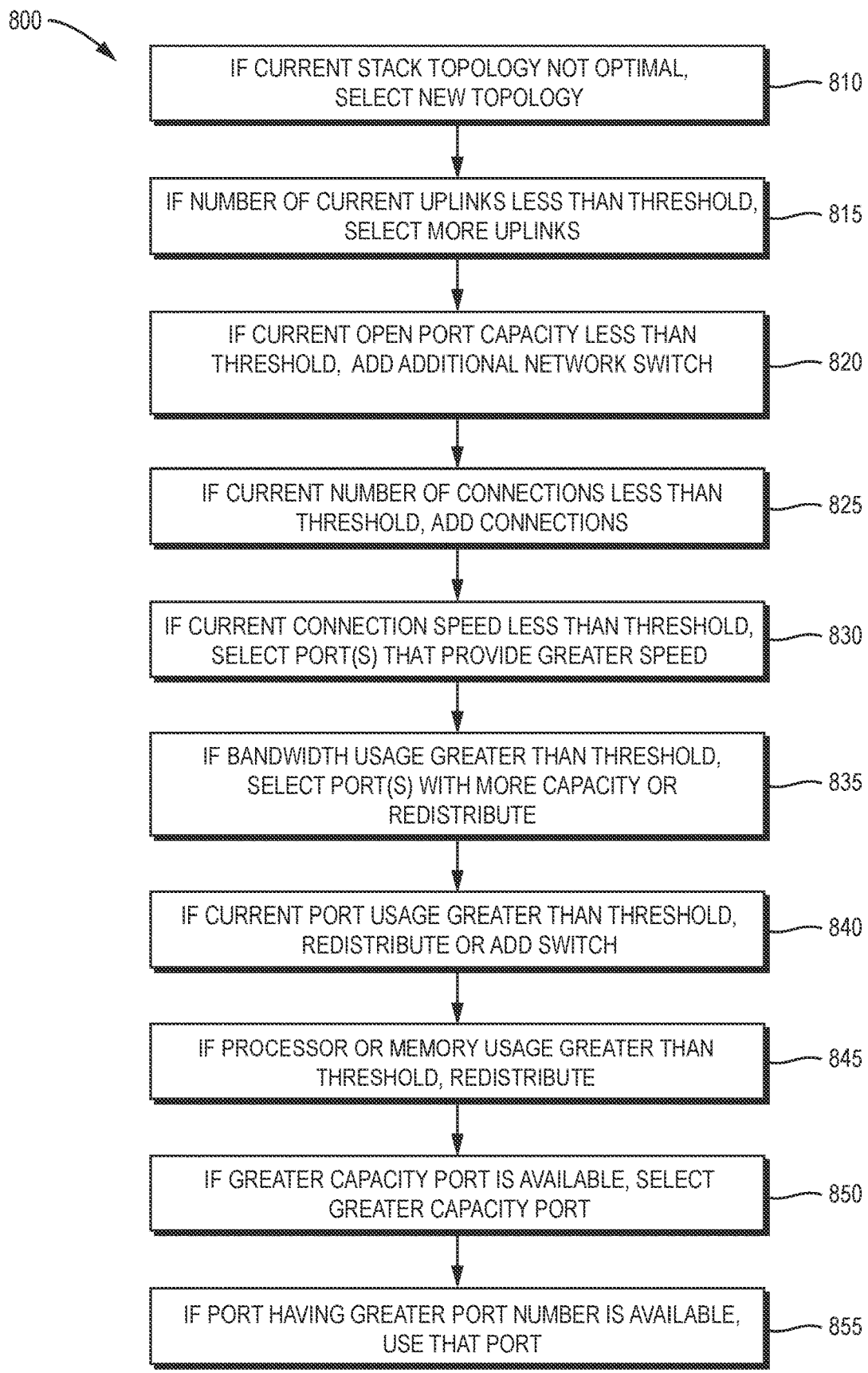
FIG. 8 is a flow diagram of an example sequence of steps for a configuration generation algorithm that may be executed by a recommendation and guidance facility to generate a configuration that is likely to have improved resiliency over a current configuration of a switch stack (if any)

FIG. 8 is a flow diagram of an example sequence of steps 800 for a configuration generation algorithm that may be executed by the recommendation and guidance facility 166 to generate a configuration that is likely to have improved resiliency over a current configuration of a switch stack (if any). At step 810-820, the configuration generation algorithm examines stack-wide factors, such as the current stack topology, the current number of uplinks for the switch stack and the current open port capacity of the switch stack. Specifically, at step 810, the configuration generation algorithm determines a current stack topology (if any) of the switch stack, and if the current stack topology is not an optimal topology, selects an optimal topology to use in the configuration. The current stack topology (if any) may be determined by the asset discovery facility 157, which as discussed above, may discover existing connections among network switches using a discovery protocol (e.g., SNMP, LLDP, etc.). The optimal topology may be a default topology coded into the configuration generation algorithm as a preferred option. Alternatively, the optimal topology may be a topology selected by a user in the user interface of the recommendation and guidance facility 166. In one implementation, the optimal topology may be set to be a loop topology, and if the current stack topology is other than a loop topology (e.g., a chain topology, a hub and spoke topology, etc.), the configuration generation algorithm may select a loop topology for the configuration.

At step 815, the configuration generation algorithm determines a number of current uplinks (e.g., Internet uplinks) for the switch stack, and if the number of current uplinks is less than a threshold, selects a greater number of uplinks for the configuration. The number of current uplinks may be determined by the asset discovery facility 157, which as discussed above, may discover existing connections among network switches using a discovery protocol (e.g., SNMP, LLDP, etc.). The threshold may be a default value coded into the configuration generation algorithm. Alternatively, the threshold may be a value selected by a user in the user interface of the recommendation and guidance facility 166. In one implementation, the threshold may be 2, and if the number of current uplinks is less than 2, the configuration generation algorithm selects 2 uplinks for the configuration.

At step 820, the configuration generation algorithm determines an open port capacity of the switch stack, and if the open port capacity of the switch stack is less than a threshold, adds an additional network switch to the configuration. The open port capacity may be determined by polling each of the network switches for port usage information. The threshold may be a default value coded into the configuration generation algorithm. Alternatively, the threshold may be a value selected by a user in the user interface of the recommendation and guidance facility 166. In one implementation, the threshold may be set to be equal to the number of port of a network switch of the switch stack with the most ports, and if the open port capacity of the switch stack is less than such number, the configuration generation algorithm may add an additional network switch to the configuration.

At steps 825-845, the configuration generation algorithm examines network switch-specific factors, including the current number of connections to other network switches, the current connection speed of any connections to other network switches, average bandwidth usage of any connections to other network switches, current port usage and average processor or memory usage. Specifically, at step 825, for each network switch in the switch stack, the configuration generation algorithm determines a number of current connections to other network switches in the switch stack, and if the number is less than a threshold, adds an additional connection to the configuration. The number of connections to other network switches may be determined by the asset discovery facility 157, which as discussed above, may discover existing connections among network switches using a discovery protocol (e.g., SNMP, LLDP, etc.). The threshold may be a default value coded into the configuration generation algorithm. Alternatively, the threshold may be a value selected by a user in the user interface of the recommendation and guidance facility 166. In one implementation, the threshold may be 2, and if the connections to other network switches in the switch stack is less than 2, the configuration generation algorithm adds an additional connections to the configuration to ensure 2 connections.

At step 830, for each network switch in the switch stack, the configuration generation algorithm determines the current connection speed of any connections to other network switches in the switch stack, and if the connection speed is less than a threshold selects a port (or multiple ports with link aggregation) for the configuration that provides a greater connection speed. The connection speed may be determined by polling each of the network switches for port settings. The threshold may be a default value coded into the configuration generation algorithm. Alternatively, the threshold may be a value selected by a user in the user interface of the recommendation and guidance facility 166. In one implementation, the threshold may be set to 1 Gbps, 2.5 Gbps or another value, and if the connection speed is less than 1 Gbps, 2.5 Gbps, etc., the configuration generation algorithm selects a port (or multiple ports with link aggregation) that provides a greater connection speed to use in the configuration.

At step 835, for each network switch in the switch stack, the configuration generation algorithm determines an average bandwidth usage of any connections to other network switches in the switch stack, and if the bandwidth usage is greater than a threshold, selects a port (or multiple ports with link aggregation) for the configuration that provides greater capacity and/or redistributes connected devices in the configuration to other switches of the switch stack to lower bandwidth usage. The average bandwidth usage may be determined by polling each of the network switches for port statistics. The threshold may be a default value coded into the configuration generation algorithm. Alternatively, the threshold may be a value selected by a user in the user interface of the recommendation and guidance facility 166. In one implementation, the threshold may be set to 70% and if the bandwidth usage is greater than 70%, the configuration generation algorithm selects a port (or multiple ports with link aggregation) that provides greater capacity and/or redistributes connected devices to other switches of the switch stack.

At step 840, for each network switch in the switch stack, the configuration generation algorithm determines port usage on the network switch, and if the port usage is greater than a threshold, redistributes connected devices to other switches of the switch stack in the configuration to lower port usage or adds an additional network switch to the switch stack in the configuration. The port usage may be determined by polling each of the network switches for in use ports. The threshold may be a default value coded into the configuration generation algorithm. Alternatively, the threshold may be a value selected by a user in the user interface of the recommendation and guidance facility 166. In one implementation, the threshold may be set to be set to 70%, and if the port usage is greater than 70%, the configuration generation algorithm redistributes connected devices to other switches of the switch stack.

At step 845, for each network switch in the switch stack, the configuration generation algorithm determines average processor or memory usage on the network switch, and if the processor or memory usage is greater than a threshold redistributes connected devices to other switches of the switch stack in the configuration to lower average processor or memory usage. The average processor or memory usage may be determined by polling each of the network switches for their device statistics. The threshold may be a default value coded into the configuration generation algorithm. Alternatively, the threshold may be a value selected by a user in the user interface of a recommendation and guidance facility 166. In one implementation, the threshold may be set to 80%, and if processor or memory usage is greater than 80%, the configuration generation algorithm redistributes connected devices to other switches of the switch stack in the configuration.

At steps 850-855, the configuration generation algorithm examines port-specific factors such as current port capacity and current port number. Specifically, at step 850, for each port of each network switch in the switch stack, the configuration generation algorithm determines current port capacity, and if a greater capacity port is available selects a greater capacity port to use in the configuration. The port capacity may be determined by polling each of the network switches for their port statistics.

At step 855, for each port of each network switch in the switch stack, the configuration generation algorithm determines current port number, and if a port having a greater (or lessor) port number is available, selects that port to use in the configuration. Such selection may consolidate port usage on the network switch so continuous groups of ports are utilized (e.g., providing wiring benefits). Whether greater or lessor port numbers are preferred may be determined based on a default preference coded into the configuration generation algorithm. Alternatively, the preference may be selected by user in the user interface of the recommendation and guidance facility 166.

Figure 9:
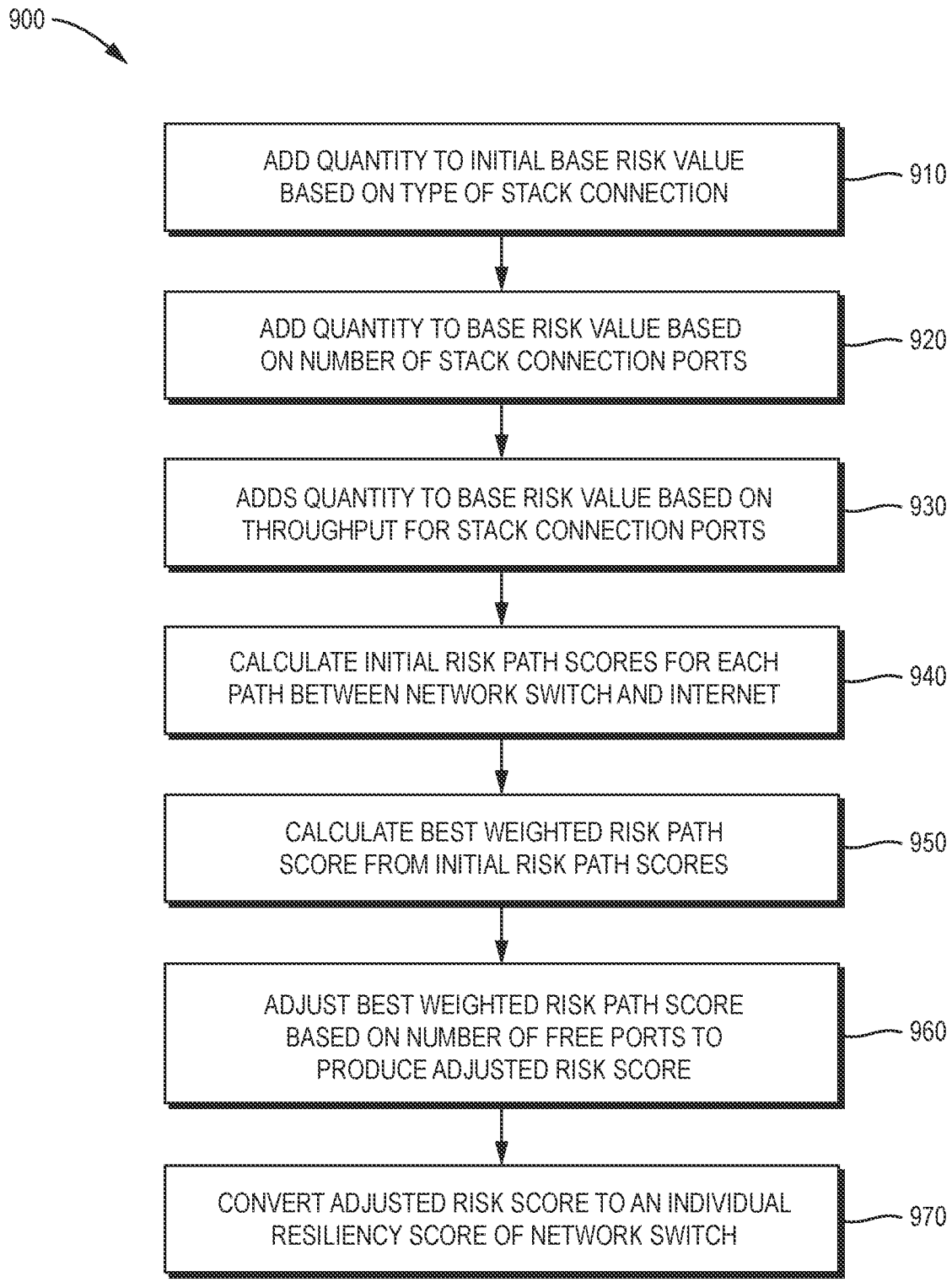
FIG. 9 is a flow diagram of an example sequence of step for a resiliency score calculation algorithm that may be executed by the recommendation and guidance facility to calculate an individual resiliency score of each network switch of a switch stack.
Figure 10A:
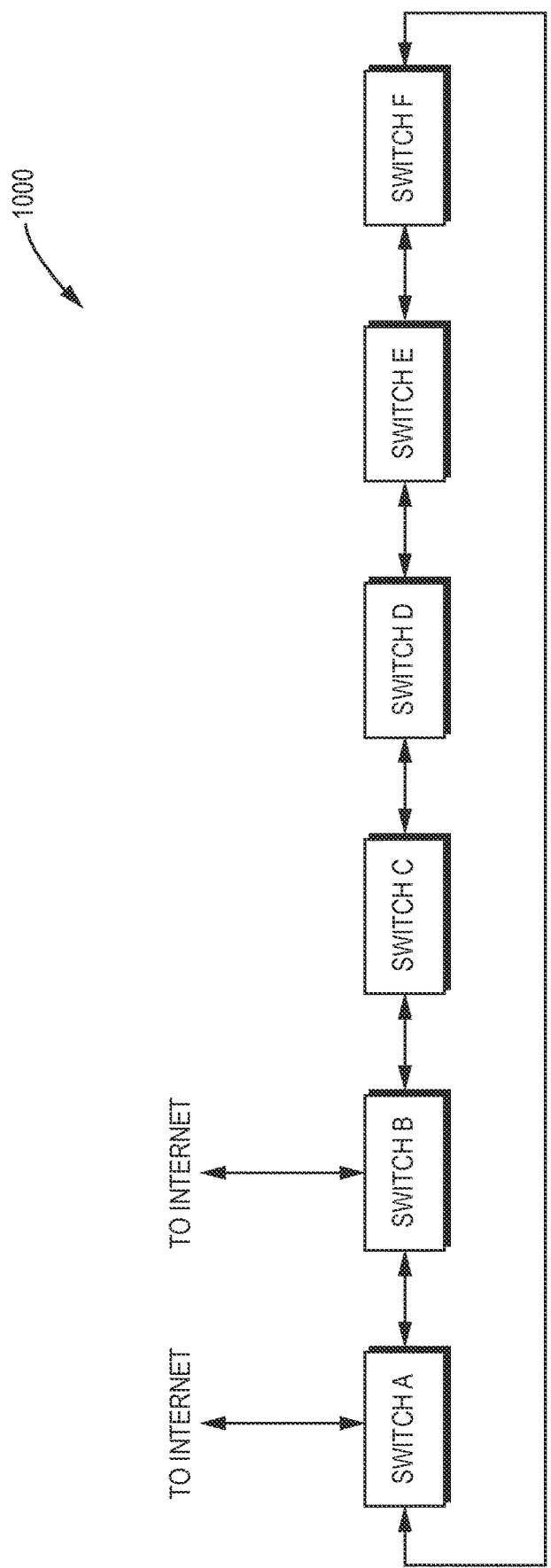
FIG. 10A is a diagram of an example switch stack that may be used to explain steps of the resiliency score calculation algorithm of FIG. 9.
Figure 10B:
FIG. 10B is a table showing an example of quantities that may be calculated by the resiliency score calculation algorithm of FIG. 9 for the example switch stack of FIG. 10A.

FIG. 9 is a flow diagram of an example sequence of step 900 for a resiliency score calculation algorithm that may be executed by the recommendation and guidance facility 166 to calculate an individual resiliency score of each network switch of a switch stack. As mentioned above, from a set individual resiliency scores for the switch stack a lowest resiliency score may be used as the resiliency score of the switch stack. FIG. 10A is a diagram of an example switch stack 1000 may be used to explain steps of the example resiliency score calculation algorithm of FIG. 9. FIG. 10B is a table 1050 showing an example of quantities that may be calculated by the example resiliency score calculation algorithm of FIG. 9 for the example switch stack 1000 of FIG. 10A.

At steps 910-930, the resiliency score calculation algorithm calculates a base risk value of the network switch (corresponding to column 1055). The base risk value may represent an inverse of an initial individual resiliency score. The base risk value may be calculated based on factors such as a type of stack connection for the network switch, a number of stack connection ports for the network switch, and/or throughput for stack connection ports for the network switch. For instance, at step 910 the resiliency score calculation algorithm adds a quantity (corresponding to column 1060) to an initial base risk value (e.g., 0) based on a type of stack connection. In one implementation, the resiliency score calculation algorithm adds a first value (e.g., 1) if link aggregation is used and a second value (e.g., 0) if not. At step 920, the resiliency score calculation algorithm adds a quantity (corresponding to column 1065) to the base risk value based on a number of stack connection ports. In one implementation, the resiliency score calculation algorithm adds a first value (e.g., 2) if there are 2 stack connection ports and a second value (e.g., 1) if there are 1 or 3+ connection port. At step 930, the resiliency score calculation algorithm adds a quantity (corresponding to column 1070) to the base risk value based on throughput for stack connection ports for the network switch. In one implementation, the quantity is a weighted quantity) that is selected based on the fastest speed of available stack connection ports. For example, if the fastest speed meets or exceeds a threshold (e.g., 10 Gbs) the quantity may be selected to be a first value (e.g., 2), if the fastest speed is 0 the quantity may be selected to be a second value (e.g., 0), and if the fastest speed is between the threshold and 0 and the quantity may be set to a value proportionally between first value and second value. The result may be the base risk value for the network switch.

At steps 940-950, the resiliency score calculation algorithm calculates a best weighted risk path score (corresponding to column 1075) based on the base risk value (corresponding to column 1055) of any network switches on a path between the network switch and a connection to a network (e.g., the Internet). At step 940, if there are multiple paths between the network switch and a connection to a network (e.g., the Internet), the resiliency score calculation algorithm calculates initial risk path scores for each (corresponding to columns 1080 and 1082). In one implementation, the resiliency score calculation algorithm may calculate each initial risk path score for a network switch as the greatest base risk of any network switch on a respective path between the network switch and the connection to the network (e.g., the Internet). At step 950, the resiliency score calculation algorithm calculates a best weighted risk path score from the initial risk path scores. In one implementation, the resiliency score calculation algorithm may calculate the best weighted risk path score of a network switch as the lowest initial risk path score for the network switch weighted by a percentage calculated by dividing the number of active ports on the network switch by all ports on the network switch (corresponding to column 1085).

At step 960, the resiliency score calculation algorithm adjusts the best weighted risk path score (corresponding to column 1075) based at least in part on a number of free ports of the network switch to produce an adjusted risk score (corresponding to column 1090). In one implementation, the resiliency score calculation algorithm adjusts the best weighted risk path score based on a percentage (corresponding to column 1095) calculated by dividing the number of free ports on the network switch by the number of free ports in the entire switch stack, which may provide an indication of how difficult it would be to relocate connections if the network switch failed.

At step 970, the resiliency score calculation algorithm converts the adjusted risk score (corresponding to column 1090) to an individual resiliency score of the network switch (corresponding to column 1097). In one implementation, the conversion may take the inverse of the adjusted risk score.

In conclusion, the above description describes various improved techniques to guide configuration of a switch stack. In various embodiments, a recommendation and guidance facility may identify one or more network switches to be added to the switch stack. It may further identify any existing connections among ports. Using this information, the recommendation and guidance facility may build a set of configurations for the switch stack. The recommendation and guidance facility may calculate a resiliency score, select a configuration based on the configuration's respective resiliency score, and display one or more stack connection recommendations that are implementable by a user to achieve the selected configuration and the possible resiliency score.

It should be understood that a wide variety of adaptations and modifications may be made to the techniques to suit various implementations and environments. While it is discussed above that aspects of the techniques can be implemented by specific software executing on specific hardware, it should be understood that the techniques may also be implemented by different software, different hardware, or various different combinations thereof that are suitable for a particular environment. Software may include instructions in a high-level programming language (e.g., C++) or low-level programming language (e.g., assembly language, hardware description language, database programming language, etc.) that may be stored, and compiled or interpreted to run on hardware. For example, instructions may be stored on a non-transitory computing-device readable medium that when executed on one or more processors are operable to perform the above techniques.

While it is discussed above that certain portions of the techniques can be arranged or distributed in certain ways, it should be understood a wide variety of other arrangements are also possible, and that portions of the techniques may be distributed across software, hardware, or combinations thereof in a wide variety of other manners. For example, functionality may be distributed across any of the devices or systems described above, or all of the functionality may be integrated into a single device or system. Likewise, means for performing any steps described above may include any of the hardware and/or software described above. All such permutations and combinations are intended to fall within the scope of the present disclosure.

It should be understood that the ordering of any method steps discussed above may be changed to suit various applications or requirements. Absent an explicit indication to the contrary, the order of steps described above may be modified such that a subsequent step occurs before a preceding step, or in parallel to such step.

Above all, it should be understood that the above descriptions are meant to be taken only by way of example. Numerous variations, additions, omissions, and other modifications will be apparent to one of ordinary skill in the art, and such variations, additions, omissions, and other modifications should be considered within the scope of this disclosure. Thus, while example embodiments have been shown and described, it will be apparent to those skilled in the art that changes and modifications may be made therein without departing from the spirit and scope of this disclosure.

What is claimed is:

1. A method for guiding configuration of a switch stack, comprising:
   identifying, by software executing on a computing device, one or more network switches to be added to the switch stack;
   identifying, by the software, any existing connections among ports of any existing network switches of the switch stack;
   building a plurality of configurations for the switch stack to connect one or more ports of the one or more network switches to other ports of the one or more network switches or to ports of any existing network switches of the switch stack;
   calculating, by the software, a resiliency score for each of the plurality of configurations, wherein the resiliency score is a measure of resistance to and impact of failure of a component of the switch stack;

selecting a configuration from the plurality based on the configuration's respective resiliency score; and displaying, by the software to a user, one or more stack connection recommendations that are implementable to achieve the selected configuration and respective resiliency score.

2. The method of claim 1, further comprising:

detecting, by the software, that the one or more stack connection recommendations have been implemented; and displaying, by the software to the user, the respective resiliency score as a current resiliency score of the switch stack.

3. The method of claim 2, further comprising:

monitoring the current resiliency score of the switch stack;

in response to the current resiliency score meeting a criteria:
building a reconfiguration for the switch stack,
calculating a new resiliency score for the reconfiguration, and
displaying to the user one or more stack connection recommendations that are implementable to achieve the reconfiguration and the new resiliency score.

4. The method of claim 1, further comprising:

accessing one or more text explanations for the one or more stack connection recommendations from a library of predetermined text explanations; and displaying the one or more text explanations together with the one or more stack connection recommendations.

5. The method of claim 1, wherein the one or more network switches are new network switches that are initially not coupled to a network.

6. The method of claim 5, further comprising:

promoting, by the software, the user to connect the one or more new network switches to the network; and establishing communication between the one or more new network switches and a central management facility, wherein the software is part of the central management facility.

7. The method of claim 1, wherein the one or more network switches are existing network switches that are already coupled to a network, and the one or more existing network switches are already in communication with a central management facility, wherein the software is part of the central management facility.

8. The method of claim 1, wherein the switch stack includes one or more existing connections among ports, and the one or more stack connection recommendations includes a stack connection recommendation to change the existing connection.

9. The method of claim 1, wherein the calculating the resiliency score comprises:

calculating an individual resiliency score of each network switch of the switch stack in the configuration to produce a set of resiliencies; and using a lowest individual resiliency score from the set of resiliencies as the resiliency score for the switch stack.

10. The method of claim 9, wherein the calculating the individual resiliency score comprises:

calculating a base risk of the network switch based at least in part on a type of stack connection for the network switch, a number of stack connection ports for the network switch, and/or throughput for stack connection ports for the network switch;

calculating a risk path score based on the base risk of any network switches between the network switch and a connection to a network;

adjusting the risk path score based at least in part on a number of free ports of the network switch to produce an adjusted risk score; and converting the adjusted risk score to the individual resiliency score of the network switch.

11. A non-transitory computer readable medium having software encoded thereon, the software when executed by one or more computing devices operable to:

calculate a current resiliency score of a switch stack, wherein the current resiliency score is a measure of resistance to and impact of failure of a component of the switch stack;

build a reconfiguration for the switch stack, wherein the reconfiguration includes a change to implement a different stack topology for the switch stack, to use a different stack connection port on a network switch of the switch stack, to use a different connection speed for a port for a network switch of the switch stack, or to use a different number of connected devices for a network switch of the switch stack;

calculate a new resiliency score achievable by the reconfiguration; and display to a user one or more stack connection recommendations that are implementable to achieve the reconfiguration and new resiliency score.

12. The non-transitory computer readable medium of claim 11, wherein the software when executed is further operable to:

detect that the one or more stack connection recommendations have been implemented; and display the new resiliency score as the current resiliency score of the switch stack.

13. The non-transitory computer readable medium of claim 11, wherein the software when executed is further operable to:

monitor the current resiliency score of the switch stack, wherein the operations to build the reconfiguration for the switch stack are performed in response to the current resiliency score meeting a criteria.

14. The non-transitory computer readable medium of claim 11, wherein the software operable to calculate the new resiliency score comprises software operable to:

calculate an individual resiliency score of each network switch of the switch stack in the configuration to produce a set of resiliencies; and use a lowest individual resiliency score from the set of resiliencies as the new resiliency score.

15. The non-transitory computer readable medium of claim 14, wherein the software operable to calculate the individual resiliency score comprises software operable to:

calculate a base risk of the network switch based at least in part on a type of stack connection for the network switch, a number of stack connection ports for the network switch, and/or throughput for stack connection ports for the network switch;

calculate a risk path score based on the base risk of any network switches between the network switch and a connection to a network;

adjust the risk path score based at least in part on a number of free ports of the network switch to produce an adjusted risk score; and convert the adjusted risk score to the individual resiliency score of the network switch.

16. An apparatus for guiding configuration of a switch stack, comprising:
one or more processors; and
one or more memories coupled to the one or more processors, the one or more memories configured to store software, wherein the software when executed on the one or more processors is operable to:
identify one or more network switches to be added to the switch stack,
identify any existing connections among ports of any existing network switches of the switch stack,
build a configuration for the switch stack to connect one or more ports of the one or more network switches to other ports of the one or more network switches or to ports of any existing network switches of the switch stack,
calculate a resiliency score for the configuration, wherein the resiliency score is a measure of resistance to and impact of failure of a component of the switch stack,
select the configuration based on the configuration's resiliency score,
display one or more stack connection recommendations that are implementable to achieve the configuration and the configuration's resiliency score,
detect that the one or more stack connection recommendations have been implemented, and
display the configuration resiliency score as a current resiliency score of the switch stack.

17. The apparatus of claim 16, wherein the software when executed is further operable to:
monitor the current resiliency score of the switch stack; and
in response to the current resiliency score meeting a criteria:
build a reconfiguration for the switch stack,
calculate a new resiliency score for the reconfiguration, and
display to the user one or more stack connection recommendations that are implementable to achieve the reconfiguration and the new resiliency score.

18. The apparatus of claim 16, wherein the one or more network switches are new network switches that are initially not coupled to a network.

19. The apparatus of claim 18, wherein the software when executed is further operable to:
prompt the user to connect the one or more network switches to the network; and
establish communication between the one or more network switches and a central management facility, wherein the software is part of the central management facility.

20. The apparatus of claim 16, wherein the one or more network switches are existing network switches that are already coupled to a network, and the one or more existing network switches are already in communication with a central management facility, wherein the software is part of the central management facility.

\* \* \* \* \*